United States Patent [19]

Motes et al.

[11] Patent Number: 5,003,528

[45] Date of Patent: Mar. 26, 1991

[54] PHOTOREFRACTIVE, ERASABLE, COMPACT LASER DISK

[75] Inventors: Raymond A. Motes; Ronald W. Gallegos, both of Colorado Springs, Colo.

[73] Assignee: The United States of America as represented by the Secretary of the Air Force, Washington, D.C.

[21] Appl. No.: 243,874

[22] Filed: Sep. 9, 1988

[51] Int. Cl.[5] .......... G11B 7/00

[52] U.S. Cl. .......... 369/110; 365/109

[58] Field of Search .......... 365/108, 109, 117, 119, 365/145, 163, 215, 234; 369/13, 108, 110

[56] References Cited

U.S. PATENT DOCUMENTS

| | | | |
|---|---|---|---|
| 3,590,249 | 6/1971 | Rabedeau | 365/109 |
| 3,702,724 | 11/1972 | Land et al. | 365/109 |
| 3,868,652 | 2/1975 | Cooper et al. . | |
| 3,903,360 | 9/1975 | Kamisaka et al. | 365/215 |
| 3,978,458 | 8/1976 | Vergnolle et al. . | |
| 3,998,523 | 12/1976 | Otomo | 365/117 |
| 4,051,465 | 9/1977 | Brody | 340/173.2 |
| 4,101,976 | 7/1978 | Castro et al. | 365/119 |
| 4,103,346 | 7/1978 | Haarer et al. | 365/119 |
| 4,139,908 | 2/1979 | Brody | 365/109 |
| 4,571,650 | 2/1986 | Ojima et al. | 360/114 |
| 4,610,903 | 9/1986 | Nomura et al. | 428/64 |
| 4,665,512 | 5/1987 | Andō369 | 44/ |
| 4,682,311 | 7/1987 | Matsubayashi et al. | 369/13 |
| 4,731,754 | 3/1988 | Ogden et al. | 365/121 |
| 4,740,430 | 4/1988 | Frankenthal et al. | 428/630 |
| 4,823,220 | 4/1989 | Milster et al. | 369/110 |
| 4,853,911 | 8/1989 | Yamazaki | 369/13 |
| 4,853,912 | 8/1989 | Akasaka et al. | 369/13 |

OTHER PUBLICATIONS

Freese R. P., "Optical disks become erasable," IEEE Spectrum, Feb. 1988, pp. 41–45.

Gookin, D. M., "Optical switch using the photorefractive effect and ferroelectric polarization reversal," Optics Letters, 12, Mar. 1987, pp. 196–198.

Motes, "Two-Beam coupling in photo refractive barium titanate", dissertation.

*Primary Examiner*—Donald McElheny, Jr.

*Attorney, Agent, or Firm*—Jules J. Morris; Donald J. Singer

[57] ABSTRACT

The invention comprises a data storage device in which ferroelectric photorefractive cells 12 susceptible to polarization for the storage of digital information are positioned on a carrier medium, preferably a disk 10, which supports the cells and allows access to them by optical beams 14, 16 and electric fields 21. A non-contacting data writing means comprising dual electrodes 20, 22 is used to change the polarity of the cells. A non-contacting data reading means comprising lasers 14, 16 and detectors 30, 34 is used to observe photorefractive effects so that the polarity of such cells 12 can be determined. The polarity of the ferroelectric photorefractive cells is coded for the storage of digital information.

19 Claims, 3 Drawing Sheets

PHOTOREFRACTIVE, ERASABLE, COMPACT LASER DISK

STATEMENT OF GOVERNMENT INTEREST

The invention described herein may be manufactured and used by or for the Government for governmental purposes without the payment of any royalty thereon.

TECHNICAL FIELD OF THE INVENTION

This invention is related to high density data storage devices and is particularly related to compact optical disks which may be erased and reused for computer mass storage applications.

BACKGROUND OF THE INVENTION

Compact laser disks provide a convenient method for storing high density digital data. A single optical disk at a standard size of 5¼ diameter can store up to 600 megabytes of information. This is equivalent to over 30 reels of magnetic tape or to 10 of the most advanced Winchester storage disks. An important advantage of optical disks is therefore their high data storage density.

A further advantage of optical disks is that they are read with a non-contacting read head, this contrasts with read heads used on conventional, magnetic storage devices. Since there are no mechanical connections to the disk during the read cycle, the optical disk has a greatly extended lifetime compared to magnetic storage devices. Optical disks are therefore virtually immune to wear and are protected from physical damage through contact when read. Typically, the layer of the optical disk which stores information is embedded within a thin layer of plastic or glass that protects it from dust or wear problems.

Another advantage of optical disks is that they are considerably more accessible than magnetic tape storage devices. Data stored on optical disks can be accessed far more quickly than data stored on conventional, magnetic data storage devices. Further, optical disks are portable and are more reliable than tapes or floppy disks.

Unfortunately, conventional laser disks have a major disadvantage. Conventional laser disks cannot be easily erased and rerecorded. This disadvantage makes them unusable for many mass data storage applications. Various schemes have recently been proposed for providing erasable, compact laser disks. It appears that at least some of these proposals rely on heating the disk to allow for erasure and rerecording. Such heating will always have a finite, detrimental effect on disk reusability and lifetime.

A need therefore exists for an erasable and reusable compact laser disk that is capable of providing high density storage and that is neither stressed nor physically manipulated when reused.

SUMMARY OF THE INVENTION

The invention comprises a data storage device in which ferroelectric photorefractive cells, susceptible to polarization for the storage of digital information, are positioned on a carrier media, preferably a disk, which supports the cells and allows access to them by optical beams and electric fields. A data writing means comprising electrodes is used to set and reset the polarity of the cells. A data reading means comprising lasers and detectors is used to observe the photorefractive cells so that the preset polarity of such cells can be determined. The polarity of the ferroelectric photorefractive cells is coded for the storage of digital information.

In the preferred embodiment of the invention the ferroelectric photorefractive cells comprise crystalline Barium Titanate. A further aspect of the preferred embodiment of the invention is the use of a substantially transparent carrier media to support the Barium Titanate crystalline cells in order to allow full access to the cells by optical means.

The preferred embodiments of the carrier medium comprises a compact data storage disk or alternately a plastic tape arranged for data recording. In either case, the Barium Titanate cells are used as the data storage media.

The preferred embodiment of the data reading means comprises two coherent laser beams which are used to observe the photorefractive effect of the ferroelectric photorefractive cells. This photorefractive effect produces coupling of the laser beams which is directional depending upon the polarization state of the cells. In this way coded data can be read and understood.

In a preferred embodiment, the reading means comprises two coherent laser beams, two optical detectors and a voltage comparator. In this embodiment the two laser beams are of equal intensity when they are directed through the ferroelectric photorefractive cells. Output from the optical detectors, which are arranged to monitor these laser beams, is directed to the voltage comparator which determines the direction of optical coupling of the laser beams and thus the optical polarity of each ferroelectric photorefractive cell observed.

Another aspect of the preferred embodiment is the use of an electronic write head that produces an electric field at discrete ferroelectric photo-refractive cells in order to select the polarization state of each cell and make it consistent with a preferred data storage protocol.

It is an object of this invention to provide a compact optical disk (laser disk) that can be easily erased and rerecorded. It is an advantage of this invention that such laser disks can be erased and rerecorded upon without the use of heat or other destructive means typically used to imprint information.

A further object of this invention is to provide a very high density data storage media that has an extended lifetime. An advantage of this invention is that optical disks manufactured according to this invention may be capable of storing in excess of 1000 megabits of information and have a virtually unlimited lifetime.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DESCRIPTION OF THE PREFERRED EMBODIMENT

This invention applies a new method for storing and reading data that utilizes the remnant polarization of ferroelectric materials.

The hysteresis of the dielectric polarization gives ferroelectric materials the capacity for non-volatile data storage. When these materials are used as a capacitor type storage device, it is necessary to apply an electric field to a crystal of the ferroelectric material to determine its state of polarization. In such a device the polarization state is read by measuring the amount of charge coupled into the material when the field is applied. If the field is applied in the direction of polarization, no polarization reversal occurs and very little charge is observed across the measurement device. If the field is applied in the opposite direction of the polarization, the polarization is reversed and a nonlinear charge is added to the linear charge observed across the measurement device. By measuring the amount of displacement charge output from the ferroelectric the original polarization can be determined. After reversing the direction of polarization during such a read cycle, the polarization must be again reversed to return the ferroelectric crystal to the original state. The process of repeatedly reading and writing, therefore, would stress the ferroelectric and produce a finite material lifetime.

In our invention, we have devised a method and mechanism for determining the polarization state of the ferroelectric crystal by using laser light without necessitating a mechanical connection or a polarization reversal. This read cycle, adopted for our invention, is made possible by using a ferroelectric material which exhibits the photorefractive effect, such as Barium Titanate ($BaTiO_3$).

Figure 1:
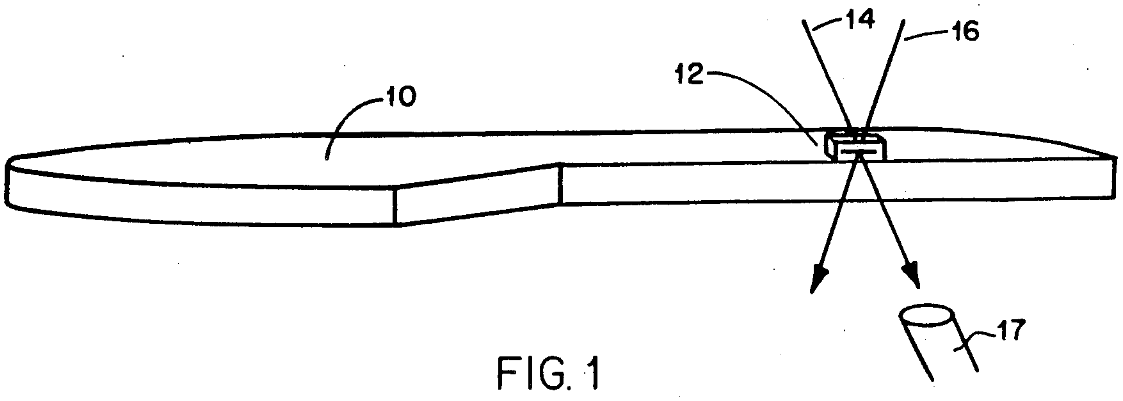
FIG. 1 is a schematic representation of the disk reading apparatus for an optical disk made according to the principles of this invention.

FIG. 1 is a schematic representation of an embodiment of the invention in which laser light is used to read the polarization state of a ferroelectric, photorefractive crystal. A transparent and non-conductive optical disk 10 has been prepared with a multitude of ferroelectric crystals 12. Two coherent laser beams 14, 16 are positioned to intersect at a single photorefractive cell 12. An index grating is thereby produced in the material with a spatial phase 90° out of phase with the resulting intensity interference pattern. This index grating may take a fraction of a second to initially build up but is semi-permanent if the crystal is not flooded by light. In practice, the index grating will remain as long as the disk is kept in a darkened enclosure such as a cassette. It can be enclosed in a cassette during the manufacturing process. The index grating causes one of the two laser beams to be coupled into the other beam. The direction of coupling (from beam 14 to beam 16 or from beam 16 into beam 14) is determined by the direction of the polarization vector in the crystal. By switching the polarization direction, the output beam coupling can be quickly switched from one direction to the other. Switching speeds of less than 1 microsecond and switching intensity ratios of 500 have been achieved.

It is possible to use this ferroelectric photorefractive material in the compact laser disk format to store data in the polarization state of the ferroelectric. The data is written according to a protocol that translates digital states into polarization state of the ferroelectric. The data is then read using two laser beams as shown in FIG. 1 and as is described in greater detail below.

An electric field is used to write the polarization state of the ferroelectric cell. The write head, which may be combined with the optical read head, has a simple design as is shown schematically in FIG. 2. Identical and opposing head elements 20, 22 make construction relatively simple. The write head electrodes 20, 22 are essentially dual pin heads that develop a strong electric field 21 therebetween when a voltage is applied to them. The electric field producing heads of FIG. 2 are miniaturized and directed to the degree that they will only affect one information bearing ferroelectric cell 12 at a time.

The voltage applied to the electrodes is strong enough to polarize the ferroelectric cell directly between them but not strong enough to polarize adjacent cells. The fact that ferroelectrics have a threshold voltage associated with establishing a polarization state makes this relatively easy.

Figure 2:
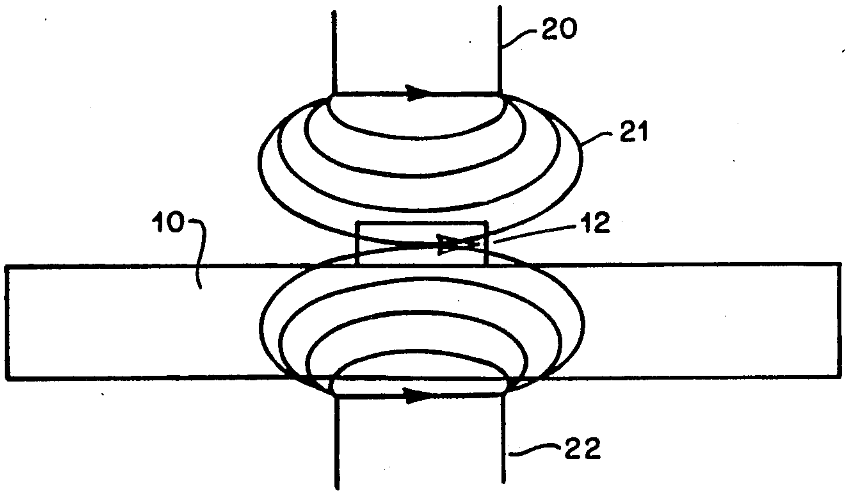
FIG. 2 is a schematic representation of a disk writing apparatus for the optical disk of FIG. 1.

The write mechanism 20, 22 as shown in FIG. 2 is a non-contacting write head. Therefore, neither the read nor write cycles require a physical connection. The read cycle is non-destructive, allowing an unlimited number of read cycles for each cell. The write cycle lifetime for a ferroelectric cell fabricating using a rapid thermal annealing technique has been shown to be greater than $1\times10^{11}$ cycles.

The information is stored in ferroelectric cells which retain their polarization state for an extended period; however, after long periods of non-use, initial preparation of the disk might be necessary to read the information. When the disk is used on a regular basis, no preparation is required since the process of reading the disk maintains the large index gratings. If, however, the disk is not used for several months the grating might decay making it necessary to prepare the disk for reading. Since the photorefractive effect takes only a fraction of a second to build up the initial grating, the disk can be easily prepared by scanning the laser beams over the entire disk. This scanning builds up the index grating which allows the data to be read The drive mechanism may be automatically set to conduct scannings which renew the index gratings during idle periods. This would allow for the disk to be always available for rapid readout.

An advantage associated with this design is that read and write processes can be conducted simultaneously. This means that while data is being written, the written data can be monitored and verified; this shortens the data verification process considerably. Simultaneously reading and writing can also be used to control the write head polarization voltage applied to the electrodes, when the data is successfully written, the voltage is removed. This speeds up the write process and minimizes stress on the crystals.

Readout of the polarization direction in bulk $BaTiO_3$ using the photorefractive effect has been tested and discussed in great detail in the dissertation of Raymond A Motes submitted to the University of New Mexico in May 1987 and entered on Sept. 9, 1987; it is entitled "Two-Beam Coupling in Photorefractive Barium Titanate" and is herein incorporated by reference.

For mass data storage it is necessary for ferroelectric cells to have dimensions of about 10 $\mu m^2$ or smaller. These dimensions are easily attainable with current IC fabrication technology. For these dimensions, the photorefractive coupling must be strong enough to detect a change in intensity for alternate polarization directions. The photorefractive coupling equation is as follows:

$$I_1(L) = I_1(O)\frac{1 + \frac{I_2(O)}{I_1(O)}}{1 + \frac{I_2(O)}{I_1(O)}\exp(-\Gamma L)}. \quad (1)$$

In this equation, $I_1(O)$ and $I_2(O)$ represent the intensities of beam 14 and beam 16, respectively, before entering the crystal 12 and $I_1(L)$ is the intensity of beam 14 after passing through the crystal. The length of the crystal is given by L and the photorefractive coupling coefficient by $\Gamma$. If the polarization direction is reversed, the sign of $\Gamma$ changes for equation (1).

From equation (1), the switching ratio SR (defined as the intensity of beam 14 with the ferroelectric polarization in one direction divided by the intensity of beam 14 with the ferroelectric polarization in the opposite direction) is $$SR = \frac{1 + \frac{I_2(O)}{I_1(O)}\exp(\Gamma L)}{1 + \frac{I_2(O)}{I_1(O)}\exp(-\Gamma L)}. \quad (2)$$

If we let $I_2$ be much larger than $I_1$ then equation (2) reduces to $$SR = \exp(2\Gamma L). \quad (3)$$

Photorefractive coupling coefficients of 17 $cm^{-1}$ are not uncommon. With $L = 10\ \mu m$, the switching ratio is 1.034. This is easily detected assuming the intensity stability of the laser is less than 1%. Lasers which meet this intensity stability requirement are available.

Figure 3:
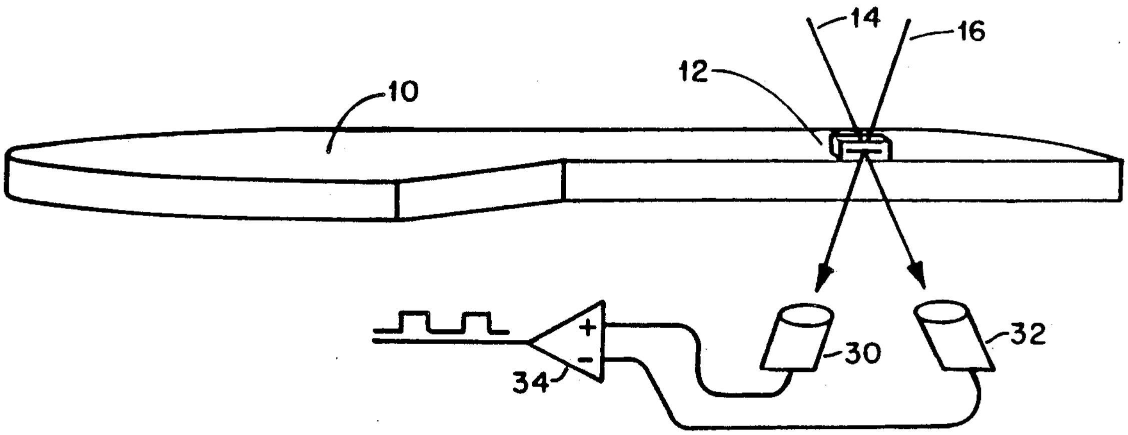
FIG. 3 is a schematic representation of a disk reading technique utilizing two optical detectors and a comparator.

If one detector is used as shown in FIG. 1, a reference voltage will have to be defined that is halfway between the maximum intensity and minimum intensity. Any variations in the transmitted intensity due to effects other than polarization will require that a new reference voltage be calculated. A technique for detecting the polarization state of the cell that requires no threshold voltage calculation and is insensitive to intensity variations, including laser noise, is shown in FIG. 3. This technique requires two detectors 30, 32 and equal intensities for the two input beams 14, 16 (i.e., a split beam from a single source). In this case the switching ratio reduces to $$SR = \exp(\Gamma L). \quad (4)$$

The output of the two detectors is simply input into a voltage comparator 34. If the output of detector 32 is higher than that of detector 30, the comparator output is high. If the output of detector 30 is higher than that of detector 32, the comparator output is low. This allows the polarization state of the cell to be directly converted to digital information at the comparator output. If the two laser beams originate from the same laser, each beam contains the same noise. This noise is canceled by the comparator through common mode rejection ratio and does not affect its ability to detect polarization vector direction.

Figure 4:
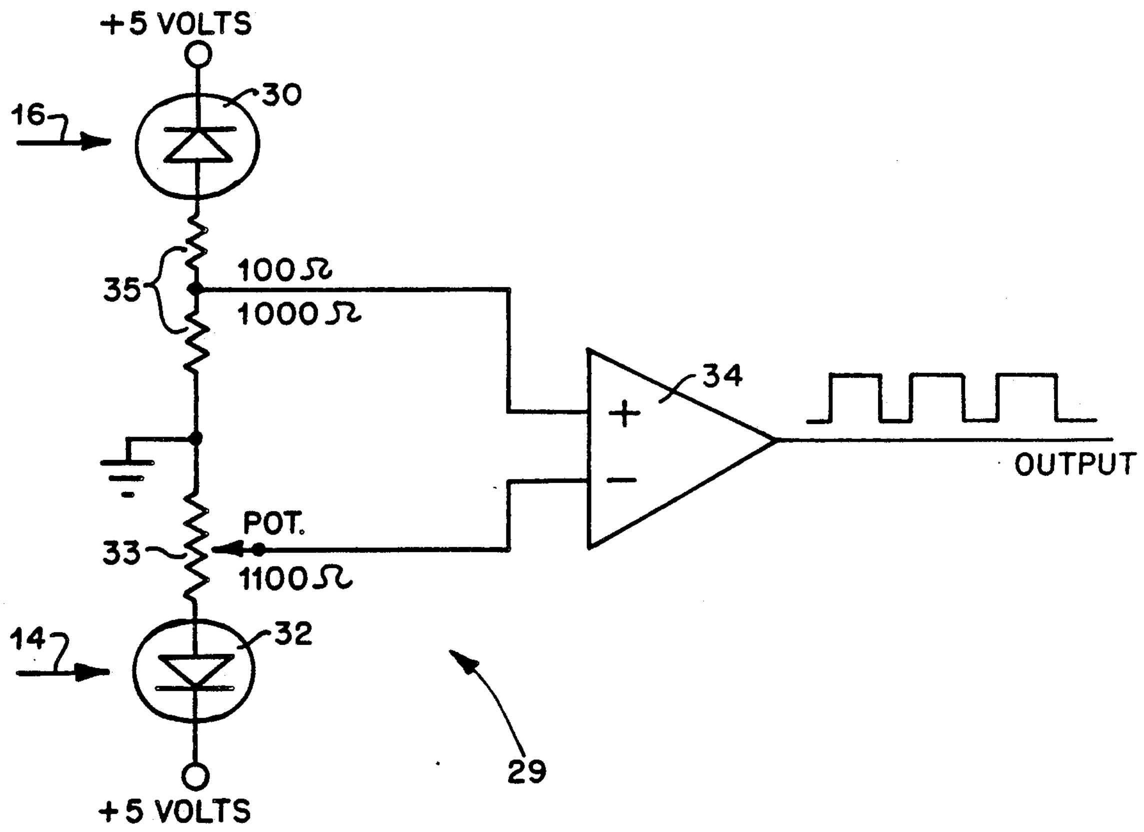
FIG. 4 is a schematic diagram of a balancing circuit for use with the comparator of FIG. 3.

In FIG. 4 we show the detector balancing circuit 29 design in detail. Photodiode detectors 30, 32 are used since they can be made very small. These photodiodes are operated in the reverse bias mode. The diodes conduct current in the reverse direction when exposed to light. This current flow causes a voltage to develop across the resistors. Detector 32 is connected to a potentiometer 33 instead of a fixed resistor (35) so the output of the detectors can be balanced. The potentiometer is used to compensate for differences in the detectors, the two laser sources, and in the two optical paths. After both legs of the circuit 29 are balanced, the signal outputs are input to a comparator 34 which compares the output voltages of the two detector circuit legs. If the polarization of the memory cell is to the right detector 32, output from the right circuit leg will be larger than from the left detector 30 circuit leg. The comparator output will then be zero indicating a logic level of "0". If the polarization of the memory cell to the left, the circuit leg of detector 30 will have the larger output voltage. In this case the comparator output will be high (+5 volts) indicating a logic level of "1". The output of the comparator is immediately compatible with other digital circuitry.

In the above description we have assumed that the memory cell 12 has a horizontal polarization. It is also possible to use a photorefractive, ferroelectric memory cell that has vertical polarization.

There are several advantages with the vertical design. It is easier, for example, to manufacture the optical disk with vertical polarization. After the disk is constructed, the ferroelectric memory cells need to be poled to orient the pole domains in the desired direction. If a vertical polarization is used, all the memory cells can be poled simultaneously by placing large electrodes on both sides of the disk. Another advantage of vertical polarization is that vertically polarized disks have increased packing density. We calculate that the preferred height of the ferroelectric, photorefractive cells should be 3.4 μm and the horizontal dimensions should be 1.5 μm with 0.25 μm between each cell. On a 5¼ inch disk this will allow for 4.7 Gigabits of information to be stored; a very large amount. If horizontal polarization is used as described above, the horizontal and vertical dimensions are reversed giving a somewhat smaller packing density.

Figure 5:
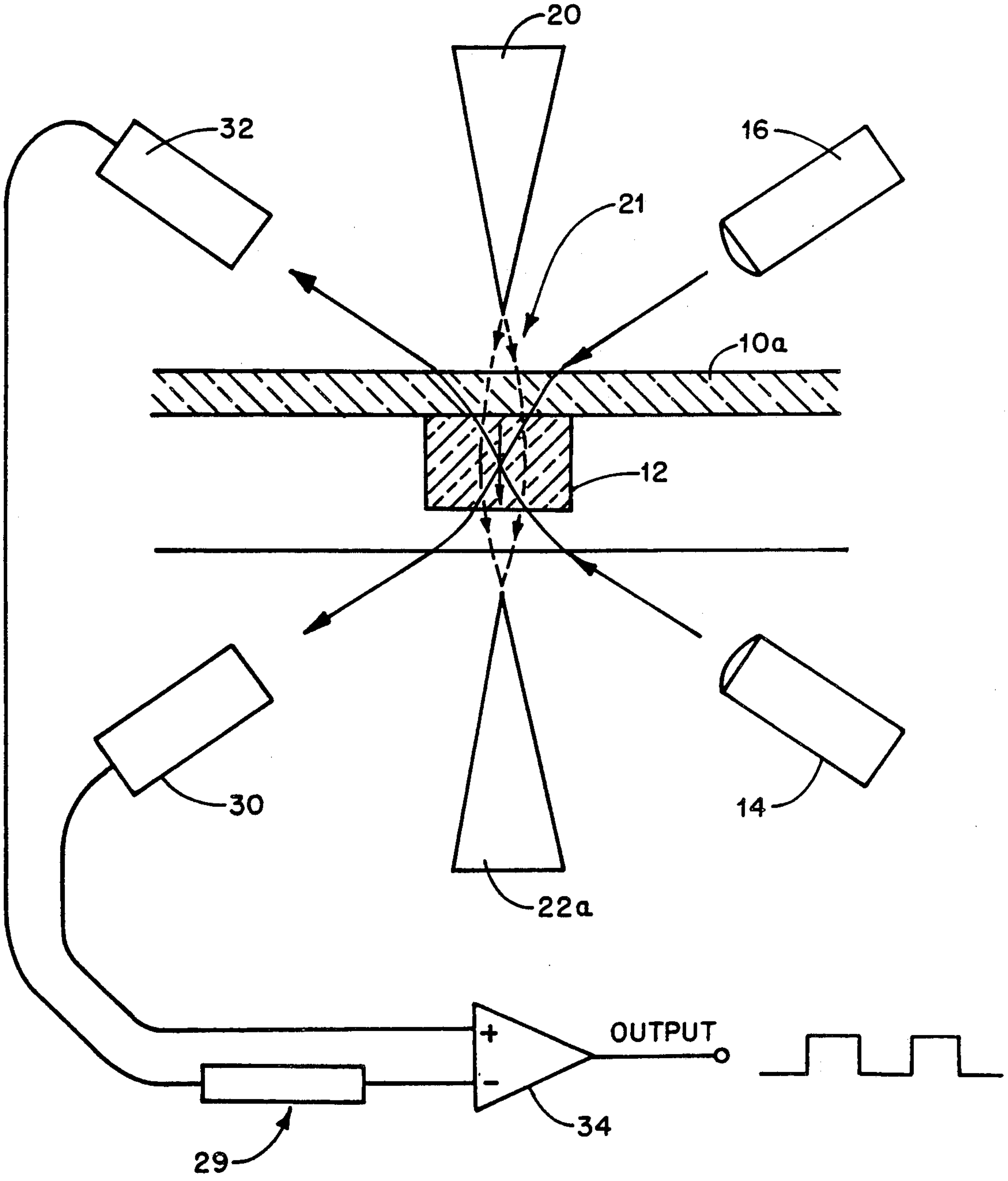
FIG. 5 is a schematic representation of an embodiment of this invention having vertical cell polarization.

A schematic representation of a combined read/write head for use with a disk 10a having vertical polarization is shown in FIG. 5. The elements of the device are identical to those described above and have been given identical reference numerals. The relative orientation of the disk 10a has been rotated 90° to allow detectors 30, 32 to read the vertical polarization in cell 12 with laser sources 14 and 16. Write heads 20a and 22a are simplified to single electrodes to generate a field vertically across the memory cell 12 in order to adjust its vertical polarization. In all other respects this optical disk storage device operates identically with the one described in reference to FIGS. 2 and 3.

The embodiments discussed above are physically feasible using current integrated circuit and laser technologies. The major advantage of using this technique for reading and writing information on a laser disk is that the ferroelectric cells, or crystals, can be completely protected from damage. They are neither contacted nor heated, nor stressed in any significant manner. Unlike other optical disk systems, the crystals that store the information are merely subjected to standoff lighting and electric fields. This means that the expected lifetime of read/write disks manufactured according to this invention can be as high as 200 years depending on how often the information is rewritten.

Typically, the method of storing and retrieving information from the compact optical storage device of this invention comprises the steps of preparing a storage media with a layer of ferroelectric photorefractive material and forming them into discrete crystalline cells which may be separately addressed. The polarity of these cells is then set according to a digital code by means of a data writing mechanism which produces a local electric field that sets cell polarity. Reading of the disk is accomplished by means of observation of the photorefractive effect through the use of optical beams. These beams are directionally coupled according to the polarity of the ferroelectric crystalline cells.

In the preferred embodiments, the storage media for the crystalline ferroelectric cells (disks or tapes) is transparent. It is also possible, however, to prepare a reflective media that may permit optical reading of the ferroelectric cells. We have also found that the most suitable ferroelectric material for the device is barium titanate which can be polarity switched at room temperature. Other materials, however, can possibly be used to practice this invention. These materials include potassium niobate, lithium niobate, lithium tantalate, lead zirconate, potassium tantalate, lead zirconate titanate and PLZT(PbLaZrT:$O_3$). The materials used, however, must possess both the photorefractive and ferroelectric properties that allow electrical polarity reversal and optical observation of polarity through directional coupling.

The paramount advantage of this new laser disk is its ability to be erased and rewritten. This ability is based on the reading and writing mechanism described above and may also be applied for data storage in plastic tapes that are wound in a reel or cassette as well as memory storage built into an integrated electrooptical circuit, preferably in an optical computer. A laser or optical disk made according to this invention has the capability of high density storage in excess of one billion bits or 1000 megabits of information. Further it has an extended lifetime which as far as we can determine, is in the hundreds of years, truly permanent data storage. All current laser disks either do not have a multiple read-write capability or have a limited lifetime due to thermal or physical stressing of the disk during the read or write cycles.

While the invention has been particularly described with reference to the preferred embodiments thereof, it will be understood by those skilled in the art that various changes in substance and form can be made therein without departing from the spirit and scope of the invention as detailed in the appended claims. For example, the storage medium does not need to be completely transparent but merely sufficiently translucent or reflective to provide optical access to the storage cells.

What is claimed is:

1. A data storage media comprising:

a layer of ferroelectric photorefractive cells, said cells being selectively polarizable by means of electric fields; and a carrier medium for supporting said layer of ferroelectric photorefractive cells, said carrier medium and said layer being optically transparent, and said carrier medium being non-conductive to electric currents so that said electric fields penetrate said carrier medium to interact with said layer of ferroelectric photorefractive cells to selectively polarize said cells.

2. The data storage media of claim 1 wherein said ferroelectric photorefractive cells comprise Barium Titanate.

3. The data storage media of claim 1 wherein said substantially transparent carrier media comprises a compact data storage disk.

4. The data storage media of claim 1 wherein said substantially transparent carrier media comprises a plastic tape arranged for data recording.

5. The data storage media of claim 1 wherein said ferroelectric photorefractive cells comprise a material selected from the group consisting of:

(a) Barium Titanate;
(b) Lithium Niobate;
(c) Potassium Niobate;
(d) Lithium Tantalate;
(e) Lead Zirconate;
(f) Potassium Tantalate;
(g) Lead Zirconate Titanate; and
(h) PLZT.

6. A data storage device comprising:

a data storage media comprising:

ferroelectric photorefractive cells susceptible to polarization for the storage of digital information; and a substantially transparent carrier medium, non-conductive to electric currents, for supporting said ferroelectric photorefractive cells and allowing access to said cells by optical beams therethrough and electric fields therethrough;

a data writing means utilizing electric fields for changing the polarity of said cells, said data writing means being located externally from said data storage media; and a data reading means utilizing laser light for observing photorefractive effects in said cells determined by the polarity of said ferroelectric photorefractive cells, said data reading means being located externally from said data storage media.

7. The data storage device of claim 6 wherein said data reading means comprises:

means for generating two laser beams, the laser beams criss-crossing each other in the ferroelectric photorefractive cell to interact with the polarization therein;

means for detecting the optical coupling of the two beams which is determined by the direction of the polarization; and means for producing a high signal or a low signal depending on the direction of polarization affect on the criss-crossing beams entering into said means for detecting.

8. The data storage device as defined in claim 7 further including means to equalize the outputs of two detectors of said means for detecting.

9. The data storage device of claim 6 wherein said ferroelectric photorefractive cells are vertically polarized relative to the carrier medium.

10. The data storage device of claim 6 wherein said substantially transparent carrier medium comprises a compact data storage disk.

11. The data storage device of claim 6 wherein said substantially transparent carrier medium comprises a plastic tape arranged for data recording.

12. The data storage device of claim 6 wherein said ferroelectric photorefractive crystals comprise a material selected the group consisting of:

(a) Barium Titanate;
(b) Lithium Niobate;
(c) Potassium Niobate;
(d) Lithium Tantalate;
(e) Lead Zirconate;
(f) Potassium Tantalate;
(g) Lead Zirconate Titanate; and
(h) PLZT.

13. The data storage device of claim 6 wherein said data writing means comprises a non-contacting electronic write head for producing an electric field at a ferroelectric photorefractive cell in order to select the polarization state of said cell.

14. A method of storing and retrieving information from a compact optical data storage medium, said data storage medium being a layer of ferroelectric photorefractive crystalline material deposited on a substrate, said material forming cells for the storage of information, said method comprising the steps of:

setting the polarity of said ferroelectric photorefractive crystalline cells according to a digital code by means of a data writing means which produces a local electric field that sets cell polarity, said data writing means being external to said data storage medium; and reading the polarity of said ferroelectric photorefractive crystalline cells in order to discern a digital code by means of a data reading means wherein a laser light is used to observe photorefractive effects as determined by the polarity of said ferroelectric photorefractive crystalline cells, said data reading means being external to said data storage medium.

15. The method of storing and retrieving information from a compact optical storage medium according to claim 14 further comprising the step of using two optical detectors, a voltage comparator and two coherent optical beams of equal intensity as the data reading means for determining the optical polarity of said ferroelectric photorefractive cells.

16. The method of storing and retrieving information from a compact optical storage medium according to claim 14 wherein said ferroelectric photorefractive material comprises Barium Titanate.

17. The method of storing and retrieving information, from a compact optical storage medium according to claim 14 wherein said storage medium is substantially transparent.

18. The method of storing and retrieving information from a compact optical storage medium according to claim 17 wherein said substantially transparent carrier medium comprises a plastic tape arranged for data recording.

19. The method of storing and retrieving information from a compact optical storage medium according to claim 17 wherein said substantially transparent carrier medium comprises a compact data storage disk.

* * * * *